United States Patent
Choi et al.

(10) Patent No.: US 11,636,676 B2
(45) Date of Patent: Apr. 25, 2023

(54) METHOD AND APPARATUS FOR EXTRACTING COLOR SCHEME FROM VIDEO

(71) Applicant: Korea Advanced Institute of Science and Technology, Daejeon (KR)

(72) Inventors: Sunghee Choi, Daejeon (KR); Suzi Kim, Daejeon (KR)

(*) Notice: Subject to any disclaimer, the term of this patent is extended or adjusted under 35 U.S.C. 154(b) by 218 days.

(21) Appl. No.: 17/143,577

(22) Filed: Jan. 7, 2021

(65) Prior Publication Data

US 2021/0248379 A1    Aug. 12, 2021

(30) Foreign Application Priority Data

Feb. 11, 2020   (KR) .................. 10-2020-0016109

(51) Int. Cl.
  *G06V 20/40*  (2022.01)
  *G06V 10/56*  (2022.01)

(52) U.S. Cl.
  CPC .............. *G06V 20/41* (2022.01); *G06V 10/56* (2022.01); *G06V 20/49* (2022.01)

(58) Field of Classification Search
  CPC ........ G06V 20/41; G06V 10/56; G06V 20/49; G06V 20/46; G06K 9/6223; G06T 11/001; G06T 7/11; G06T 7/90; G06T 2207/10016
  See application file for complete search history.

(56) References Cited

U.S. PATENT DOCUMENTS

| | | | |
|---|---|---|---|
| 2001/0004403 A1* | 6/2001 | Warnick | G06T 7/11 382/173 |
| 2005/0275640 A1* | 12/2005 | Kobayashi | H04N 9/69 345/204 |
| 2008/0246882 A1* | 10/2008 | Kobayashi | G09G 3/20 348/E5.074 |
| 2015/0317821 A1* | 11/2015 | Ding | G06T 7/11 345/420 |
| 2015/0365600 A1* | 12/2015 | Pollack | H04L 51/18 348/239 |
| 2016/0217338 A1* | 7/2016 | Li | G06V 20/40 |
| 2019/0311474 A1* | 10/2019 | Angermann | G16H 30/40 |
| 2021/0201021 A1* | 7/2021 | Novelli | G06T 7/73 |
| 2022/0012366 A1* | 1/2022 | Burceanu | H04L 9/0891 |

OTHER PUBLICATIONS

Cheng-Yu Wei, N. Dimitrova and Shih-Fu Chang, "Color-mood analysis of films based on syntactic and psychological models," 2004 IEEE International Conference on Multimedia and Expo (ICME) (IEEE Cat. No. 04TH8763), Taipei, Taiwan, 2004, pp. 831-834 vol. 2, doi: 10.1109/ICME.2004.1394329.

(Continued)

*Primary Examiner* — Santiago Garcia (57) ABSTRACT

An apparatus for extracting a color scheme from a video is provided. The apparatus comprises: a semi-master shot segmentation part for segmenting an input video into a plurality of semi-master shots through semi-master-shot boundary detection (SBD); a base palette extraction part for extracting base palettes from the segmented semi-master shots; and a color scheme merging part for merging the base palettes extracted from the semi-master shots to extract a color scheme.

20 Claims, 9 Drawing Sheets

(56) References Cited

OTHER PUBLICATIONS

Daniel Rotman, Dror Porat, Gal Ashour, and Udi Barzelay. 2018. Optimally Grouped Deep Features Using Normalized Cost for Video Scene Detection. In Proceedings of the 2018 ACM on International Conference on Multimedia Retrieval (ICMR'18). Association for Computing Machinery, New York, NY, USA, 187-195. DOI:https://doi.org/10.1145/3206025.3206055.

Kim, Suzi, and Sunghee Choi. "Color Scheme Extraction Based on Image Segmentation and Saliency Map." Journal of KIISE, 2019, pp. 1020-1022.

Hannane, R., Elboushaki, A., Afdel, K., Nagabhushan, P., & Javed, M. (2016). An efficient method for video shot boundary detection and keyframe extraction using SIFT-point distribution histogram. International Journal of Multimedia Information Retrieval, 5, 89-104.

Baraldi, Lorenzo, et al. "Shot and Scene Detection via Hierarchical Clustering for Re-Using Broadcast Video." Computer Analysis of Images and Patterns Lecture Notes in Computer Science, Sep. 2015, pp. 801-811., www.researchgate.net/publication/281619699.

\* cited by examiner

METHOD AND APPARATUS FOR EXTRACTING COLOR SCHEME FROM VIDEO

CROSS-REFERENCE TO RELATED APPLICATIONS

This application claims the priority benefit of KR Application No. 10-2020-0016109, filed Feb. 11, 2020 the contents of which are herein incorporated by reference.

BACKGROUND OF THE INVENTION

Field of the Invention

The following embodiments relate to a method and apparatus for extracting a color scheme from a video, and more particularly to a method and apparatus for automatically extracting a color scheme from a video to use as a descriptor.

Related Art

IMDb is the largest and most popular movie database, comprising more than 5 million movies. Since 2000, more than 10,000 films have been released in the U.S. and Canada alone, and the number of releases has been increasing steeply. Consequently, movie recommendations based on user preference have been researched more extensively. Most recommendation systems use social graphs based on movie metadata, such as genre, director, keyword, and cast. However, manually tagging metadata to each movie requires considerable labor, and it is extremely time consuming to re-tag every previous movie when a new metadata field is required. Therefore, extracting a unique descriptor from the video itself is very important for efficient recommendation systems.

Since a movie combines various media, it can be represented by multimodal descriptors, including visual, textual and audio features. Color is particularly significant for visual media, affecting viewer perceptions and preferences.

A color scheme is an association of colors expressed as a subset of all possible colors to represent a visual identity. Color has a strong influence on human perception to elicit emotional responses. Visual elements are the first thing that human perceives when they watch a video, and the color is the most basic element in visual aspects which influences on human's impression and emotion.

Film production strongly considers the color tone that dominates a movie, with a cinema colorist adjusting the overall movie color. Directors leverage the colors to support the narrative of movie and generate a unified fictional space. According to the Cinematography for Directors, the color scheme is an interpretation of the scenario by the cinematographer and it can convey a mood or feeling that stays with the viewer after the movie has ended. It is because the color scheme is not just a result shot by a camera, but a combination of various elements of film production, including backgrounds and sets created by a production designer, lightings set by the gaffer, and costumes created by a wardrobe.

Each field of metadata, such as genre and director, cannot be a primary key that separates all movies individually. In the same manner, we did not intend to distinguish all movies only with the proposed color scheme. We attempt to show that the color scheme is not a unique characteristic for each movie, but a contributing factor to cluster the movies.

For example, La La Land (2016) and Whiplash (2014) are drama musical films written and directed by Damien Chazelle. They share similar metadata, i.e., director, genre, and casting, but they give different impressions due to the intensity of colors dominating the whole duration. Whiplash should also be linked to Black Swan (2010), which maintains similar color tones, but for now there is no special metadata to connect the two films. A color scheme can be a very simple and accurate descriptor to quantify a movie's miseen-scene.

Several previous studies have considered color scheme extraction from images but little attention has been paid to the extraction from a video, and particularly from a movie. A movie is an elaborate compilation by the director, embodying their message and values. In contrast to general videos, which are filmed continuously without shot or scene distinctions, movies are carefully edited with many different objects and heterogeneous content. Movies are generally longer than the general videos, although not usually exceeding three hours, and include 200,000250,000 images (assuming 24 fps). Although it is a challenge to extract major colors from so many images with complicated contents, there exists a dominant color scheme, by design, as you can imagine color palettes after watching Wes Anderson's movies.

PRIOR ART DOCUMENTS

Non-Patent Documents (Non-Patent Document 1) BARALDI L., GRANA C., CUCCHIARA R.: Shot and scene detection via hierarchical clustering for re-using broadcast video. In Computer Analysis of Images and Patterns—16th International Conference, CAIP (2015), pp. 801-811.

SUMMARY OF THE INVENTION

The embodiments relate to a method and apparatus for extracting a color scheme from a video, and more particularly to a method and apparatus for automatically extracting a color scheme from a video to use as a descriptor.

The embodiments provide a two-stage color scheme extraction technique for extracting base palettes from semi-master shots and merging the palettes into a single color scheme and provide a method and apparatus for extracting a color scheme from a video, which employ color clustering and convex hull enclosing methods to take advantage of each method's strengths.

An embodiment of the present disclosure provides an apparatus for extracting a color scheme from a video, the apparatus comprising: a semi-master shot segmentation part for segmenting an input video into a plurality of semi-master shots through semi-master-shot boundary detection (SBD); a base palette extraction part for extracting base palettes from the segmented semi-master shots; and a color scheme merging part for merging the base palettes extracted from the semi-master shots to extract a color scheme.

The semi-master shot segmentation part may provide a semi-master shot by combining contiguous shots taken in the same location with similar colors.

The semi-master shot segmentation part may segment the input video into a plurality of semi-master shots by performing semi-master-shot boundary detection (SBD) through feature extraction for each frame, similarity measurement between frames, and clustering of similar frames.

The semi-master shot segmentation part segments the input video into a plurality of semi-master shots by adopting the Imagelab Shot Detector (ILSD) segmentation method, which only considers RGB colors.

The base palette extraction part comprises: a keyframe selection part for reducing the amount of data to be clustered by selecting select keyframes; and a color clustering part for extracting a base palette from a set of selected keyframes by clustering pixels based on the distance in the color space and selecting the cluster centroids as representative colors.

The keyframe selection part provides an objective function to ensure that the keyframe captures the entire shot contents well, and the objective function is defined as a weighted sum of saliency, clarity, and representativeness for each frame.

The color clustering part weights the cluster according to pixel's visual attention using saliency maps from the selected keyframes.

The color scheme merging part performs additional clustering on the colors of the base palettes to derive a final color scheme.

The apparatus color scheme merging part extracts the color scheme using convex hull enclosing (CHE), and the convex hull enclosing (CHE) converts the plurality of base palettes into convex hull geometry for RGB color space and selects the convex hull boundary vertices as representative colors for the color scheme.

The color scheme merging part extracts the color scheme using convex hull enclosing (CHE), wherein the convex hull is split into sub-hulls, and the representative colors of the sub-hulls are selected as the final color scheme.

Another embodiment of the present disclosure provides a method for extracting a color scheme from a video by using an apparatus for extracting a color scheme from a video, the method comprising: a step of segmenting an input video into a plurality of semi-master shots through semi-master-shot boundary detection (SBD); a step of extracting base palettes from the segmented semi-master shots; and a step of merging the base palettes extracted from the semi-master shots to extract a color scheme.

In the step of segmenting an input video into a plurality of semi-master shots, a semi-master shot may be provided by combining contiguous shots taken in the same location with similar colors.

In the step of segmenting an input video into a plurality of semi-master shots, the input video may be segmented into a plurality of semi-master shots by performing semi-master-shot boundary detection (SBD) through feature extraction for each frame, similarity measurement between frames, and clustering of similar frames.

In the step of segmenting an input video into a plurality of semi-master shots, the input video may be segmented into a plurality of semi-master shots by adopting the Imagelab Shot Detector (ILSD) segmentation method, which only considers RGB colors.

The step of extracting base palettes from the segmented semi-master shots may comprise: a keyframe selection step in which keyframes are selected to reduce the amount of data to be clustered; and a color clustering step in which a base palette is extracted from a set of selected keyframes by clustering pixels based on the distance in the color space and selecting the cluster centroids as representative colors.

In the keyframe selection step, an objective function may be provided to ensure that the keyframe captures the entire shot contents well, and the objective function may be defined as a weighted sum of saliency, clarity, and representativeness for each frame.

In the color clustering step, the cluster is weighted according to pixel's visual attention using saliency maps from the selected keyframes.

In the step of merging the base palettes extracted from the semi-master shots to extract a color scheme, additional clustering may be performed on the colors of the base palettes to derive a final color scheme.

In the step of merging the base palettes extracted from the semi-master shots to extract a color scheme, the color scheme may be extracted using convex hull enclosing (CHE), and the convex hull enclosing (CHE) may convert the plurality of base palettes into convex hull geometry for RGB color space and select the convex hull boundary vertices as representative colors for the color scheme.

In the step of merging the base palettes extracted from the semi-master shots to extract a color scheme, the convex hull may be split into sub-hulls, and the representative colors of the sub-hulls may be selected as the final color scheme.

According to the embodiments, it is possible to provide a method and apparatus for automatically extracting a color scheme from a video to use as a descriptor.

According to the embodiments, it is possible to provide a two-stage color scheme extraction technique for extracting base palettes from semi-master shots and merging the palettes into a single color scheme, and to provide a method and apparatus for extracting a color scheme from a video, which employ color clustering and convex hull enclosing methods to take advantage of each method's strengths.

DESCRIPTION OF EXEMPLARY EMBODIMENTS

Hereinafter, the embodiments of the present disclosure will be described with reference to the accompanying drawings. However, the embodiments of the present disclosure may be modified in various other forms, and the scope of the present disclosure is not limited to the embodiments described below. In addition, embodiments of the present disclosure are provided in order to more completely explain the present disclosure to those with average knowledge in the art. In the drawings, the shapes and sizes of elements may be exaggerated for clearer explanation.

Figure 1:
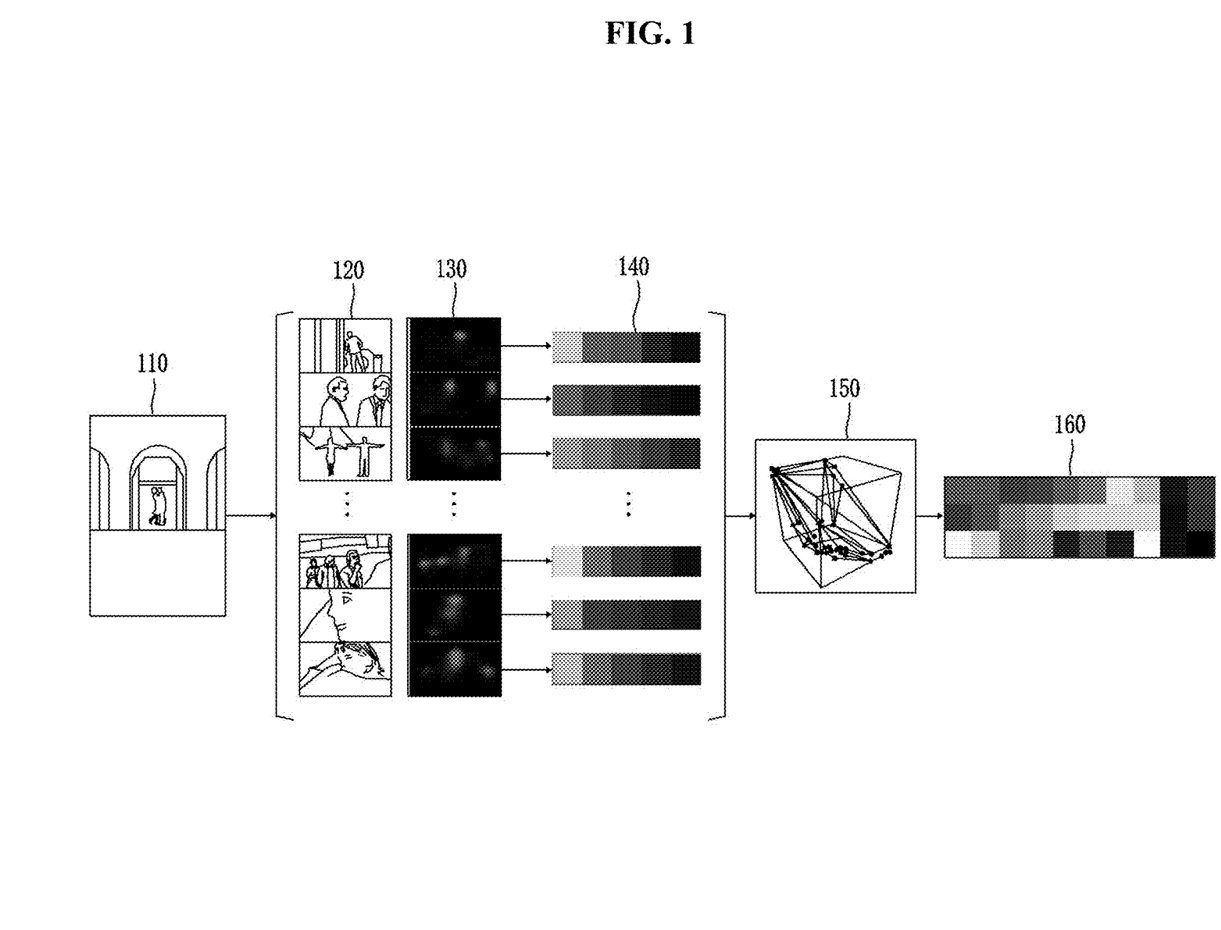
FIG. 1 is a view illustrating color scheme extraction according to an embodiment.

FIG. 1 is a view illustrating color scheme extraction according to an embodiment.

Referring to FIG. 1, a color scheme is extracted to represent a video (e.g., movie)'s visual identity. The video 110 is segmented into semi-master shots, and keyframes 120 are selected from each. Base palettes 140 may be generated from the selected key frames 120 using saliency maps 130. Also, convex hull enclosing 150 may convert a set of base palettes 140 into convex hull geometry for RGB color space and select the convex hull boundary vertices as representative colors for the color scheme 160.

A color scheme is an association of colors, i.e., a subset of all possible colors, that represents a visual identity. The following embodiments propose an automated method to extract a color scheme from a movie. Since a movie is a carefully edited video with different objects and heterogeneous content embodying director's messages and values, it is a challenging task to extract a color scheme from a movie as opposed to a general video filmed at once without distinction of shots or scenes. Despite such challenges, color scheme extraction plays a very important role in film production and application. The color scheme is an interpretation of the scenario by the cinematographer and it can convey a mood or feeling that stays with the viewer after the movie has ended. It also acts as a contributing factor to describe a film, like the metadata fields of a film such as a genre, director, and casting. Moreover, it can be automatically tagged unlike metadata, so it can be directly applied to existing movie database without much effort.

In the following embodiments, a color scheme can be produced from a movie in a bottom-up manner from segmented shots. The color extraction can be formulated as a selection problem where perceptually important colors are selected using saliency. Also, it is possible to provide a semi-master-shot, an alternative unit defined as a combination of contiguous shots taken in the same place with similar colors. Herein, the plausibility of the proposed embodiments will be demonstrated and validated using real movie videos.

Figure 2:
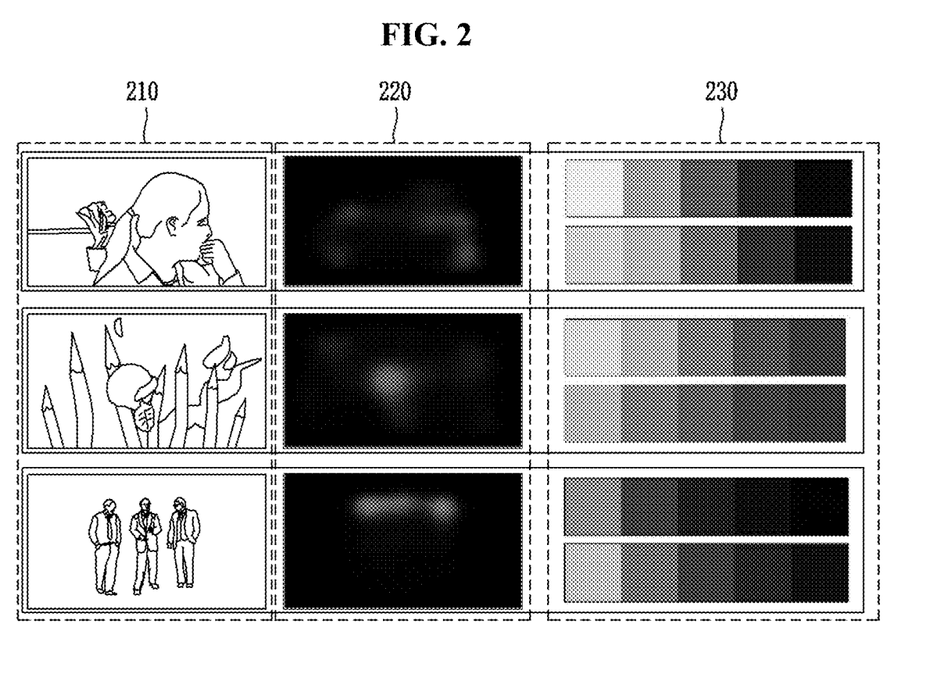
FIG. 2 is a view illustrating saliency maps for color clustering according to an embodiment.

FIG. 2 is a view illustrating saliency maps for color clustering according to an embodiment.

Referring to FIG. 2, 210 shows input image, 220 shows saliency map, the top of 230 shows color scheme without saliency, and the bottom of 230 shows color scheme with saliency.

Simple color clustering methods struggle to obtain valid dominant image colors due to interference from colors that appear frequently, but are meaningless. A saliency map is essential for valid color scheme extraction to ensure that the color selection reflects object importance in the video.

A movie's overall color scheme cannot be obtained through simple color clustering methods, due to interference of colors that appear repeatedly but meaninglessly, such as sky, walls, or black clutter. A saliency map is a solution to ensure that color selection reflects object importance in the movie. Saliency maps represent pixel significance within each image by following human fixation points. Since major pixels dominate the color impression, rather than all pixels, saliency maps may be employed to obtain a color scheme from each frame.

The embodiments are the first work to generate a color scheme from a video. Extracting a color scheme from images has been well studied in computer graphics because the color scheme is the most basic unit for image recoloring and vectorization. The reason why color scheme extraction is difficult for video is that it should not be driven by a less significant long-shot and need to consider the overall colors of the video. So, a video is split into small units, and the final color scheme is chosen in a bottom-up manner.

Also, the embodiments define a semi-master-shot, which is a new unit to combine contiguous shots taken in the same location with similar colors. The semi-master-shot can be used in video processing, which has been actively studied for decades, such as video highlight detection and video thumbnail generation.

Beyond simple saliency adoption, the embodiments take into consideration on how to use the saliency map properly. The importance is measured in three levels, namely, the importance (saliency) of each pixel in the frame, and the importance of each frame in the shot and the importance of each shot in the movie.

Color quantization from images has been extensively studied in computer vision and graphics fields to address color loss due to image compression; display device limitations, which allow only a limited number of colors to be displayed; and color printing. It aims to express the original image with a smaller number of colors.

Recent studies have proposed a number of color scheme extraction methods for various purposes, including image recolorization, image decomposition, image abstraction, digital art, and image indexing. Color scheme extraction is typically achieved by color clustering, histogram thresholding, image segmentation, and convex hull enclosing.

Clustering approaches group the pixels based on distance in color space, where cluster centroids are selected as the representative color. Histogram thresholding converts an image into a color space histogram and identifies dominant colors by dividing the histogram into multiple sections. Convex hull enclosing converts an image into convex hull geometry for a specific color space and selects the convex hull boundary vertices as representative colors. Clustering and histogram methods always select colors that occur within the image, whereas convex hull enclosing can select colors that express the original image well but may not necessarily exist in the image.

The embodiments propose a two-stage color scheme extraction: base palette extraction from a semi-master-shot and merging palettes into a single color scheme. Color clustering and convex hull enclosing methods may be employed within the proposed pipeline to take advantage of each method's strengths.

Figure 3:
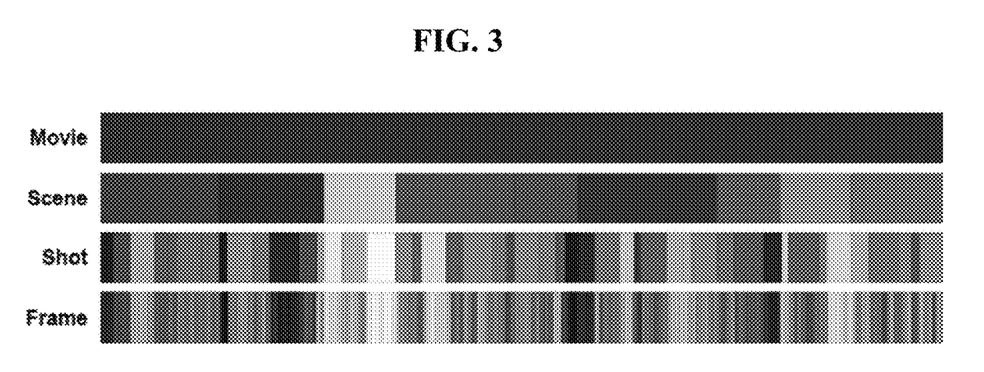
FIG. 3 is a view illustrating a movie structure according to an embodiment.

FIG. 3 is a view illustrating a movie structure according to an embodiment.

As shown in FIG. 3, a movie can be considered to consist of a linear sequence of scenes, where each scene consists of several shots. A scene is a sequence of interrelated shots that share a common semantic thread, whereas a shot is a sequence of frames filmed by a single camera without interruption. Since scenes are segmented according to the semantic context, scene segmentation is relatively less accurate than shot segmentation. It is also quite inefficient to collect color palette(s) directly from the shot because many duplicated shots occur due to video editing. Therefore, to extract color schemes as we wish, a new unit is needed that simultaneously satisfies desired accuracy and efficiency.

A master shot is a single shot that contains all the characters, representing the atmosphere of all the space being filmed. Modern movies use master shots during production stage, but they tend not to be included into the actual movie due to their unappealing style. Therefore, we define a semi-master-shot rather than true master shot, combining contiguous shots taken in the same location with similar colors.

Shot changes can occur abruptly or through a gradual transition. Abrupt transitions occur over a single frame due to camera switch; whereas gradual transitions, such as dissolve, fade-in, fadeout, and wipe, stretch over several frames with a variety of video effects. Shot segmentation aims to detect these transitions by grouping frames using image similarity.

Although most scene segmentation methods use multimodal features to reduce ambiguity, i.e., video, audio, and text, it is usually possible to detect shot segmentation transitions using video features alone, because the shot is filmed as a single take. Several video features rely on color histograms and local descriptors, such as SURF and SIFT. Herein, Baraldi's shot segmentation methods are adopted to define the movie's semi-master-shot.

The keyframe is the most representative among the set of frames covering the overall shot or scene. Video thumbnail and summarization are also based on similar principles of keyframe extraction, and have become popular with the recent increase in machine learning applications.

The main issues for keyframe extraction are how many keyframes should be selected from a shot or scene and how to select these keyframes from the set. The appropriate number of keyframes can be as few as one or several, depending on the extraction method. Simple and fast keyframe selection methods sample frames uniformly or randomly. However, these sampling methods produce unstable selection results and are difficult to determine optimal frame sampling.

Cost function thresholding addresses sampling method drawbacks, but requires considerable extra computational effort to calculate the cost function for a typical movie (up to 200,000 frames). A fixed number of keyframes can be selected from a semi-master-shot to reduce computational cost. Instead of uniform and random sampling, an objective function evaluating importance, clarity, and representativeness for each frame can be provided to ensure that the keyframe captures the entire shot contents well.

It is somewhat more difficult to extract a color scheme, particularly for movies with hundreds of shots. Even if each image within the video or movie is down-sampled to (for example) 240×135 pixels, there are up to 30,000 colors in each frame, and up to 6 billion colors in a movie. Moreover, movies include complex sets of shots with wide ranges of color tones. Therefore, color combinations appearing simultaneously in a shot need to be taken into consideration, as well as combinations throughout the movie. Previous color scheme extraction from movies has generally relied upon personal input from experienced designers. Therefore, the tendency for designers to focus on costumes, main objects, or salient backgrounds is exploited.

Previous color scheme extraction methods are generally based on evenly clustering pixels in all frames. However, as discussed previously, simple clustering tends to promote darker colors or even black. This problem persists even when only keyframe pixels are evenly clustered, tending to select meaningless backgrounds and clutters. Therefore, a color scheme extraction is proposed that incorporates three saliencies: the relative importance of the considered shot among the set of shots, the importance of the frame to the shot, and the importance of the pixel to the frame.

Figure 4:
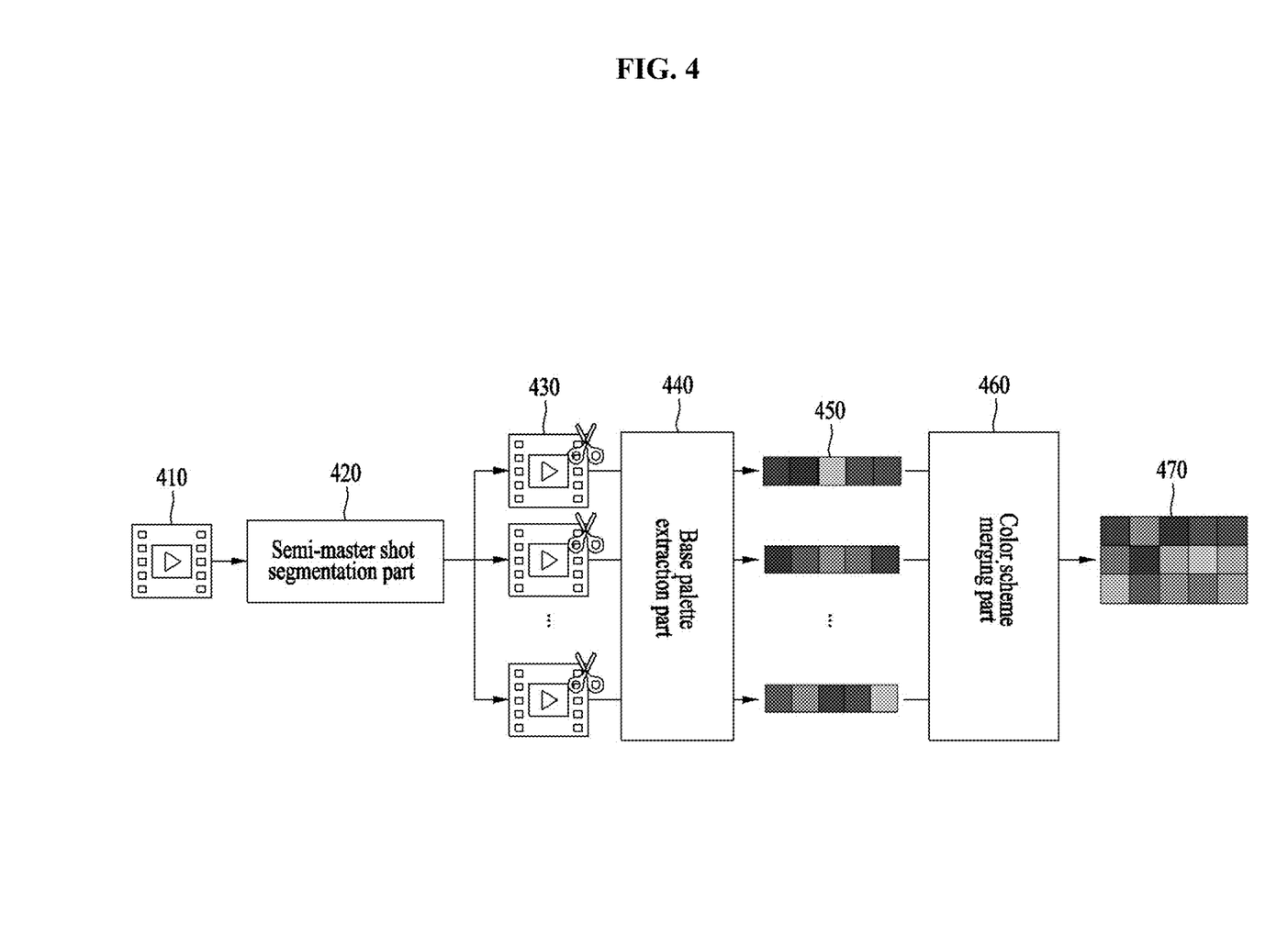
FIG. 4 is a view illustrating an apparatus for extracting a color scheme from a video according to an embodiment.

FIG. 4 is a view illustrating an apparatus for extracting a color scheme from a video according to an embodiment.

Referring to FIG. 4, the apparatus for extracting a color scheme from a video according to an embodiment may comprise a semi-master shot segmentation part 420, a base palette extraction part 440, and a color scheme merging part 460. The resulting color scheme 470 is clustered bottom-up from the segmented semi-master shots 430.

Figure 5:
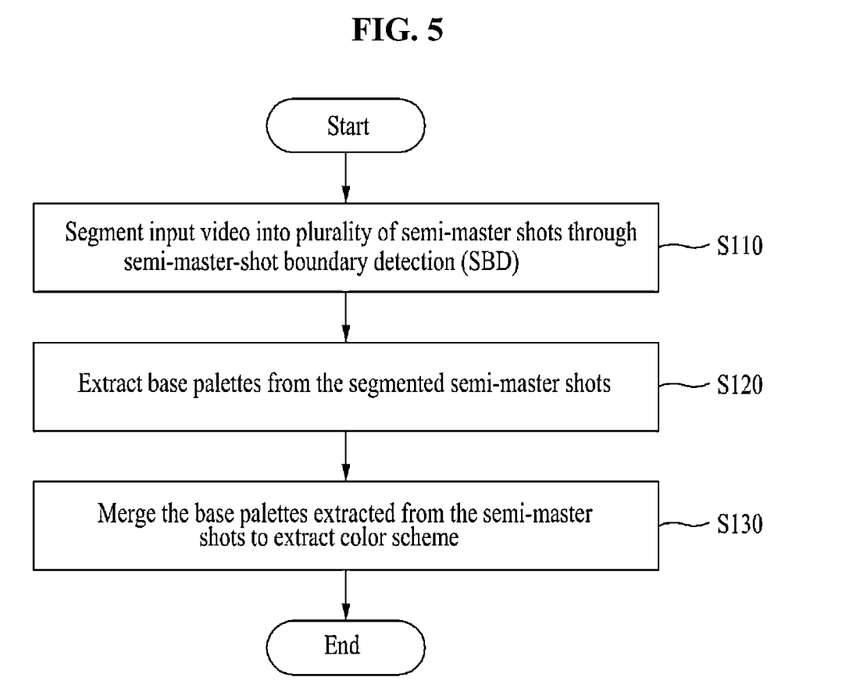
FIG. 5 is a flowchart for explaining a method for extracting a color scheme from a video according to an embodiment.

FIG. 5 is a flowchart for explaining a method for extracting a color scheme from a video according to an embodiment.

Referring to FIG. 5, the method for extracting a color scheme from a video by using an apparatus for extracting a color scheme from a video according to an embodiment may comprise: a step S110 of segmenting an input video into a plurality of semi-master shots through semi-master-shot boundary detection (SBD); a step S120 of extracting base palettes from the segmented semi-master shots; and a step S130 of merging the base palettes extracted from the semi-master shots to extract a color scheme.

The steps of the method for extracting a color scheme from a video according to an embodiment will be described below.

The method for extracting a color scheme from a video according to an embodiment will be described in more concrete details by using the apparatus for extracting a color scheme from a video which has been described with reference to FIG. 4.

In the step S110, the semi-master shot segmentation part 420 may split an input video 410 into a plurality of semi-master shots 430 through semi-master shot boundary detection (SBD). Here, the semi-master shot segmentation part 420 may provide a semi-master shot 430 by combining contiguous shots taken in the same location with similar colors.

The semi-master shot segmentation part 420 may segment the input video 410 into a plurality of semi-master shots 430 by performing semi-master-shot boundary detection (SBD) through feature extraction for each frame, similarity measurement between frames, and clustering of similar frames. Particularly, the semi-master shot segmentation part 420 may segment the input video 410 into a plurality of semi-master shots 430 by adopting the Imagelab Shot Detector (ILSD) segmentation method, which only considers RGB colors.

In the step S120, the base palette extraction part 440 may extract a base palette 450 from a segmented semi-master shot 430. The step S120 may comprise: a keyframe selection step in which keyframes 442 are selected to reduce the amount of data to be clustered; and a color clustering step in which a base palette 450 is extracted from a set of selected keyframes by clustering pixels based on their distance in the color space and selecting the cluster centroids as representative colors.

More specifically, the base palette extraction part 440 may comprise a keyframe selection part 441 and a color clustering part 444.

The keyframe selection part 444 may reduce the amount of data to be clustered by selecting select keyframes 442. Also, the keyframe selection part 444 may provide an objective function to ensure that the keyframe captures the entire shot contents well, and the objective function may be defined as a weighted sum of saliency, clarity, and representativeness for each frame. This will be described in more details below.

The color clustering part 444 may extract a base palette 450 from a set of selected keyframes 442 by clustering pixels based on their distance in the color space and selecting the cluster centroids as representative colors. The color clustering part 444 may weight the cluster according to pixel's visual attention using saliency maps 443 from the selected keyframes 442.

In the step S130, the color scheme merging part 460 may merge the base palettes 450 extracted from the semi-master shots 430 to extract a color scheme 470.

The color scheme merging part 460 may perform additional clustering on the colors of the base palettes 450 to derive a final color scheme 470. Particularly, the color scheme merging part 460 may extract the color scheme 470 by using convex hull enclosing (CHE). In this case, convex hull enclosing (CHE) may convert a plurality of base palettes into convex hull geometry for RGB color space and select the convex hull boundary vertices as representative colors for the color scheme 470.

Figure 6:
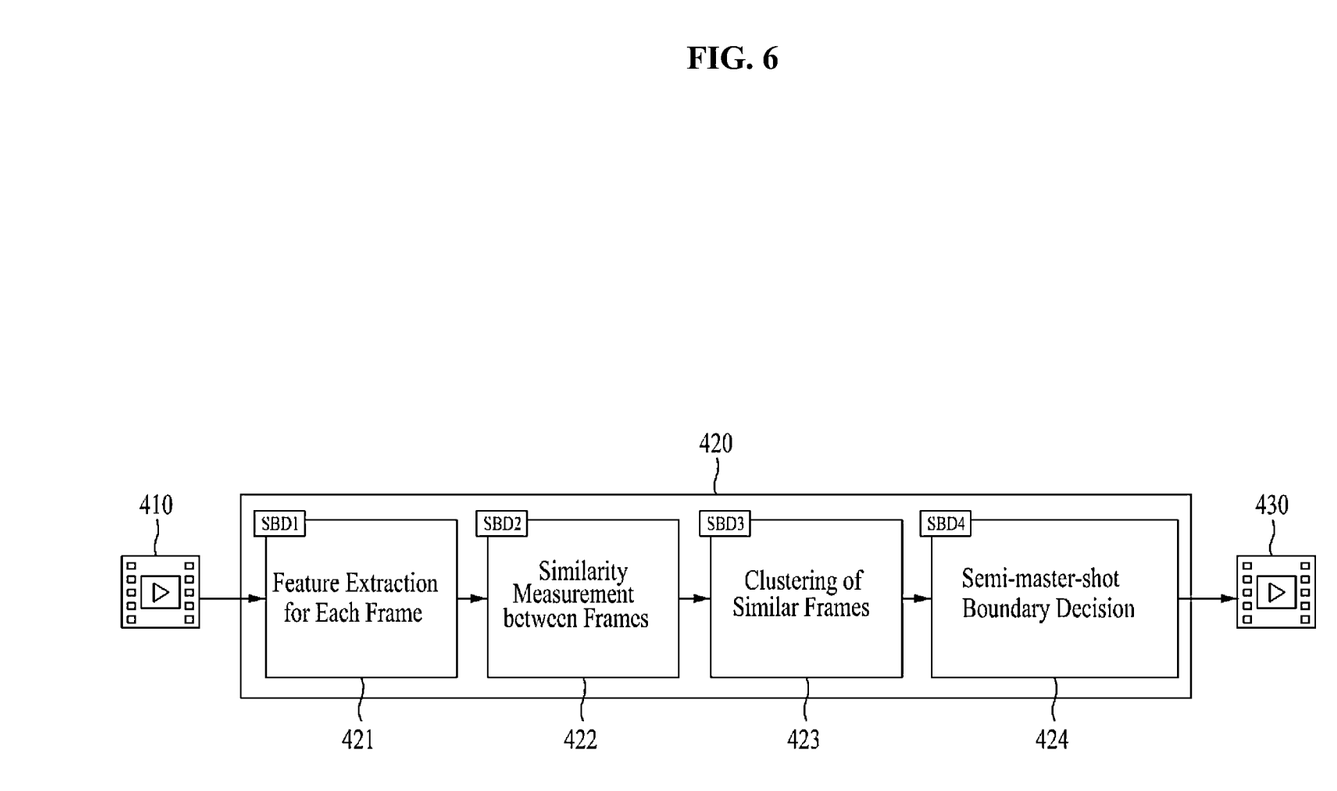
FIG. 6 is a view illustrating a semi-master shot segmentation part according to an embodiment.

FIG. 6 is a view illustrating a semi-master shot segmentation part according to an embodiment.

Referring to FIG. 6, the semi-master shot segmentation part 420 may perform semi-master shot boundary detection (SBD) and enhance segmentation accuracy and efficiency by segmenting a video into shot groups, combining contiguous shots taken in the same place with similar colors. The semi-master shot segmentation part 420 may segment an input video 410 into a plurality of semi-master shots 430 through semi-master shot boundary detection (SBD). That is, the semi-master shot segmentation part 420 may segment the input video 410 into semi-master shots 430, which is the segmented video, by performing semi-master-shot boundary detection (SBD) 424 through feature extraction for each frame 421, similarity measurement between frames 422, and clustering of similar frames 423.

Semi-master-shots 430 are generally clustered by color difference using local descriptors for similarity factors, such as SIFT or SURF, which requires considerable computational overhead. In contrast, the Imagelab Shot Detector (ILSD) segmentation method (non-patent document 1), which only considers RGB colors, may be adopted herein. ILSD measures the similarity between frames as the sum of two color difference metrics: squared difference between every corresponding pixel in two frames, and chi-squared distance of RGB color histograms. Similar frames are clustered using a sliding window to compare frame differences centered on the current frame, shifting in one direction.

Generally, ILSD detects abrupt and gradual transitions separately. The i-th frame, $f_i$, is regarded as an abrupt transition if the difference between $f_i$ and $f_{i+1}$ exceeds some threshold, T, and differences between neighboring shots exceed T=2. Gradual transitions are identified by repeating the process for detecting abrupt transition with increasing window size. After shot detection, ILSD groups adjacent shots into scenes using hierarchical clustering. In order to prevent duplicate detection of the same transition, the two adjacent transitions are separated at frame intervals of more than a constant $T_s$, which is called safe zone.

(Non-patent document 1) Although shots, which is segmented by ILSD, are grouped into a scene by clustering based on color comparison, the scene cannot be used as a semi-master-shot for two reasons. First, they perform scene clustering using a fixed number of clusters, i.e., assuming it already knows the total number of scenes. Second, since the semi-master-shot does not require perfect scene segmentation, scene clustering increases computational overhead. Therefore, semi-master-shots mitigating T may be used to determine color difference between shots. To enhance the function of the safe zone, $T^*_s$, which is proportional to the average length of shots, may be used instead of the fixed value of $T_s$.

Figure 7:
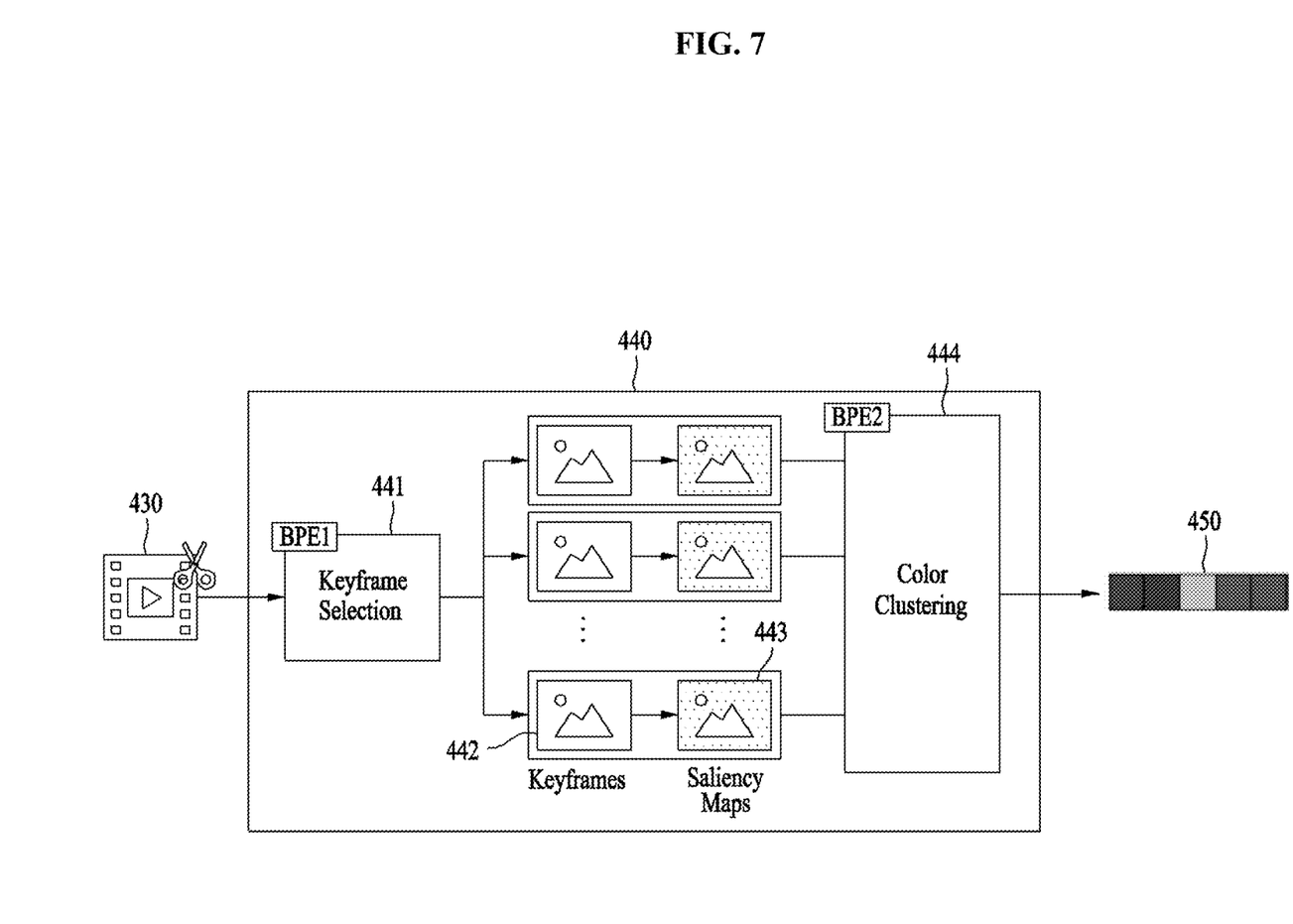
FIG. 7 is a view illustrating a base palette extraction part according to an embodiment.

FIG. 7 is a view illustrating a base palette extraction part according to an embodiment.

As shown in FIG. 7, the base palette extraction part (BPE) 440 may extract the base palette 450 from a segmented semi-master shot. Although segmented, the semi-master shot is still video, and it is challenging to extract a limited number of colors from a video containing too many frames. Therefore, the base palette extraction part (BPE) 440 extracts the base palette 450 in two stages. That is, the base palette extraction part (BPE) 440 may extract the base palette 450 through keyframe selection and color clustering. The base palette extraction part (BPE) 450 may comprise a keyframe selection part 441 and a color clustering part 444.

Here, a saliency map 443 related to human visual attention may be adopted for keyframe selection and color clustering.

The saliency map 443 represents the significance of each pixel as human fixation points. Since major pixels dominate movie impressions, rather than all pixels in every frame, the saliency map 443 may be used to help identify the optimal color palette from each frame image. The saliency map 443 from a given image may be used automatically, i.e., without pre-knowledge.

The keyframe selection part 441 may select keyframes 442 to extract the base palette 450. The keyframe best represents a set of frames covering a shot or scene's overall contents. Using keyframes 442 considerably reduces the amount of data to be clustered. The keyframe selection part 441 may select a fixed number of keyframes 442 from a semi-master shot 430 to further reduce computational cost. An objective function C(f) may be introduced to estimate importance, clarity, and representativeness for each frame to ensure that the keyframe 442 captures the entire shot contents well. The objective function C(f) may be represented by the following equation:

$$C(f) = \alpha_s C_s(f) + \alpha_c C_c(f) + \alpha_r C_r(f). \quad (1)$$

where C(f) is defined as a weighted sum of three terms: saliency ($C_s(f)$), clarity ($C_c(f)$), and representativeness ($C_r(f)$). Proper values for coefficients $\alpha_s$, $\alpha_c$ and $\alpha_r$ will be suggested later based on our experiments to lead to a balanced result.

The saliency term $C_s(f)$ measures the importance of the frame with the average of saliency values of pixels in it as below:

$$C_s(f) = \frac{\sum_{p \in f} \mu_p}{|f|}, \quad (2)$$

where $\mu_p$ is a saliency of pixel p and |f| is the total number of pixels in f. The saliency term enforces frames with high visual attention to be scored high.

The representativeness term $C_r(f)$ grades the coverage of f among all frames in the semi-master shot 430. The representativeness can be expressed as a similarity in relation to other frames existing in the same semi-master shot 430. The representativeness term is computed as below:

$$C_r(f) = \frac{\sum_{\forall f^* \in s} Sim(f, f^*)}{|S|}, \quad (3)$$

where S is the semi-master-shot that f belongs to and |S| is the total number of frames in S. Similarity between frames f and f*, Sim(f, f*), is defined by HSV histogram comparison and increased as f is more similar to many frames. For example, the pairwise distance between f and all other frames in the same semi-master shot 430 may be computed using correlation distance metrics of HSV histograms with 50 bins for each channel.

Clarity, $C_c(f)$ measures the clarity of f, i.e., the degree of blurring, using the blind/reference less image spatial quality evaluator (BRISQUE), and may be represented by the following equation:

$$C_c(f)=1-0.01*\text{BRISQUE}(f). \qquad (4)$$

The BRISQUE score is usually in the range [0, 100] and a smaller $C_c(f)$ indicates better image quality. For example, costs for all frames in the semi-master shot 430 may be examined by selecting the best three as keyframes 442.

The color clustering part 444 may extract a base palette 450 from a set of selected keyframes 442 by clustering pixels based on their distance in the color space and selecting the cluster centroids as representative colors. Rather than clustering pixel coloring equally, the cluster may be weighted according to pixel's visual attention using saliency maps 443 from the selected keyframes 442.

Saliency may be expressed as a probability rather than the value itself to prevent overfitting the color palette 450 from the saliency map 443. Pixel p from a keyframe 442 is included in the clustering target depending on probability ψ(μp), a weighted random function generating 0 or 1 with weight rip, providing the pixel saliency. This encourages including pixels with higher saliency in the clustering set, although low weighed pixels may sometimes be selected. k means clustering may be performed using pixel RGB colors from all keyframes 442 as a single set. The number of cluster centroids, k, is equal to the number of colors in a base palette 450, and k=5 is set for experiments.

Figure 8:
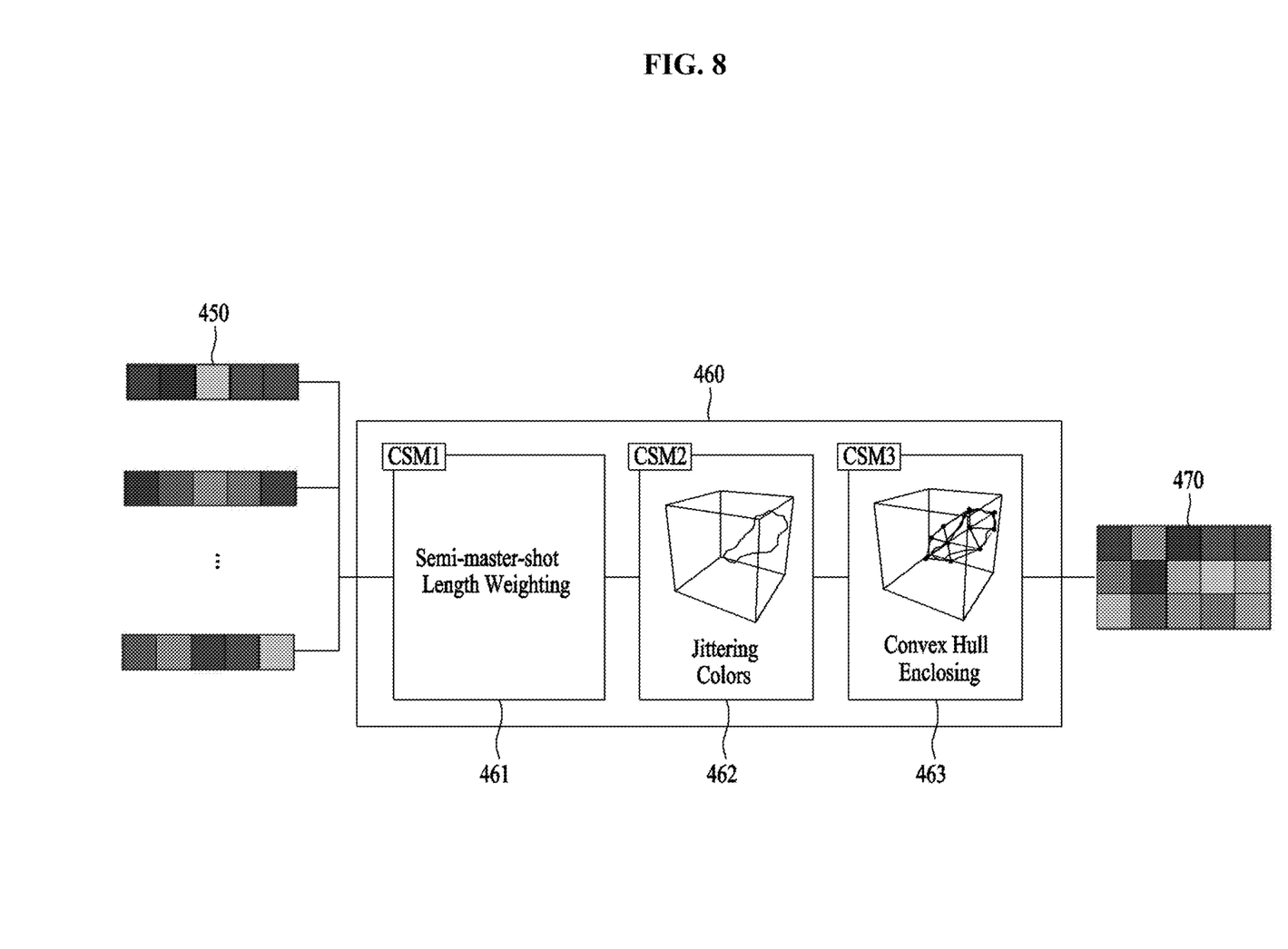
FIG. 8 is a view illustrating a color scheme merging part according to an embodiment.

FIG. 8 is a view illustrating a color scheme merging part according to an embodiment.

Referring to FIG. 8, combining all base palettes extracted from semi-master shots 430 into the scheme raises two problems. A large number of colors are retrained even in the reduced color set, due to the large number of semi-master shots 430 segmented from the input video 410; and shots taken in the same environment are sometimes separated in the video during editing, causing overlapping palettes from different semi-master shots 430. Therefore, a merge process is needed to reduce the number of colors from the base palettes 450.

The colors of the base palettes 450 are cluster centroids, i.e., they frequently appear in semi-master-shots 430. Therefore, the color scheme merging part 460 may perform additional clustering on the colors of the base palettes 450 to derive a final color scheme 470 that will tend to ignore colors that may be distinctive but are distant from the centroids.

Here, the color scheme merging part 460 may achieve this using convex hull enclosing (CHE) 463 to generate a color scheme 470 that includes all colors in the base palettes 450. The given colors may be placed in three-dimensional RGB space, and a convex hull may be generated to enclose all color points. The convex hull is then simplified to a fixed number of vertices, which is equivalent to the output palette size, while enclosing all color points. In contrast to clustering approaches, which select frequently occurring colors, convex hull enclosing CHE can identify hidden colors that encompass all exhibited colors.

Shot lengths 461 are not arbitrary, but conform with the direction's intention. Thus, important shots tend to have longer duration, and hence the base palette 450 may be weighted according to shot length. A base palette 450 is inserted into RGB space by duplicating it in proportion to its shot length 461. Since overlapping colors in RGB space does not affect the convex hull shape, it is geometrically meaningless to increase the number of identical colors by weighting within RGB space. Therefore, weights may be reflected geometrically by jittering 462 color positions, which may be given by the following equation:

$$\Pi^*=\{\pi\in\pi|\Pi\pm\Omega(-\sigma,\sigma)\}, \qquad (5)$$

where $\Pi$ is an RGB color from a given base palette 450, $\Pi$; $\Omega(-\sigma,\sigma)$ is a random function to generate an RGB vector with each RGB channel in the range $[-\sigma,\sigma]$, and $\sigma=10$ is set for experiments. The generation of jittered palette, $\Pi^*$, for the amount of shot length, $|\Pi$, is repeated. More vertices are required for the enclosing convex hull if many color points are scattered at high weight positions. Since the convex hull vertices construct a final color scheme, jittering correctly reflects the weighting.

Figure 9:
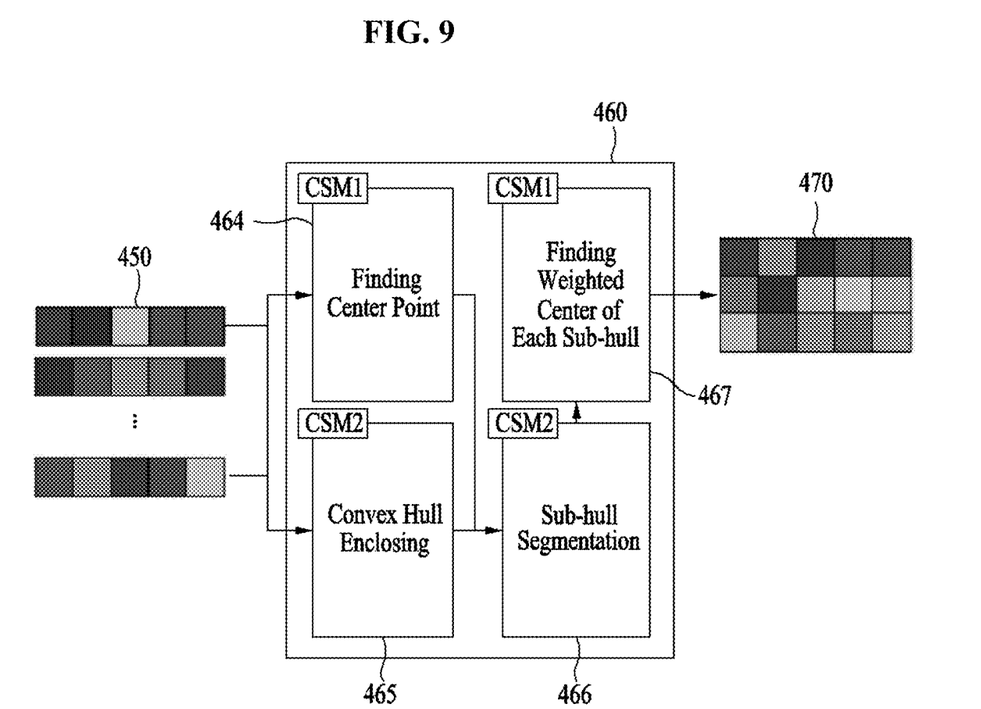
FIG. 9 is a view illustrating a color scheme merging part according to another embodiment.

FIG. 9 is a view illustrating a color scheme merging part according to another embodiment.

The colors of the base palettes 450 are cluster centroids. Therefore, the color scheme merging part 460 may perform additional clustering on the colors of the base palettes 450 to derive a final color scheme 470 that will tend to ignore colors that may be distinctive but are distant from the centroids.

The colors of each scene cannot be ignored because they are selected from the most part of the film. Therefore, the colors may be merged using convex hull enclosing (CHE) 465 to generate a color scheme 470 that includes all colors in the base palettes 450. All color points may be enclosed by placing the given colors in three-dimensional RGB space and generating a convex hull. The convex hull is then simplified to a fixed number of vertices 464, while enclosing all color points.

However, if the convex hull vertices 464 are directly used as the final color scheme 470, it is highly likely that saturated colors are selected but colors at the center of the convex hull are ignored. Accordingly, as shown in FIG. 9, rather than directly using the convex hull vertices 464 as color palettes, the convex hull may be split 466 into sub-hulls, and the representative colors 467 of the sub-hulls may be selected as the final color scheme 470.

The colors at the centroids are obtained by averaging all colors in the base palettes 450 with the same weight, and their vertices may be referred to as v. The convex hull may be simplified so that the number of sides of the convex hull mesh is equal to the final palette size «. A triangular pyramid-shaped sub-hull may be created by connecting v and each triangular side. The vertices of the sub-hull closest to the weighted center of the sub-hull may be representative colors for the sub-hull. The weighted center may be found by weighting the color node of the sub-hull according to the length of the semi-master shot to which the node belongs. The center of each sub-hull may be a color constituting the color scheme 470. This strategy may alleviate the saturation of colors and prevent selection of nonexistent colors.

According to the embodiments, it is possible to automatically extract a color scheme from a video to use as a descriptor.

According to the embodiments, it is possible to provide a two-stage color scheme extraction technique for extracting base palettes from semi-master shots and merging the palettes into a single color scheme, and to employ color clustering and convex hull enclosing methods to take advantage of each method's strengths.

The above-described apparatus may be implemented by hardware elements, software elements, and/or a combination of hardware and software elements. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processor may run an operating system (OS) and one or more software applications running on the OS. Furthermore, the processor may access, store, manipulate, process, and generate data in response to the execution of software. For ease of understanding, one processor has been illustrated as being used, but a person having ordinary skill in the art may be aware that the processor may include a plurality of processing elements and/or a plurality of types of processing elements. For example, the processor may include a plurality of processors or a single processor and a single controller. Furthermore, other processing configurations, such as a parallel processor, are also possible.

Software may include a computer program, code, an instruction, or a combination of one or more of them, and may configure the processor so that it operates as desired or may instruct the processor independently or collectively. The software and/or data may be embodied in a machine, a component, a physical device, a computer storage medium, or a device of any type, in order to be interpreted by the processor or to provide an instruction or data to the processor. The software may be distributed to computer systems connected over a network, and may be stored or executed in a distributed manner. The software and data may be stored in one or more computer-readable recording media.

The method according to the embodiments may be implemented in the form of a program instruction executable by various computer means and recorded in a computer-readable recording medium. The computer-readable medium may include program instructions, data files, data structures, or the like alone or in combination. The program instructions recorded on the medium may be specially designed and configured for the present disclosure, or may be known and usable by those skilled in computer software. Examples of the computer-readable medium include a magnetic medium such as a hard disk, a floppy disk and a magnetic tape, an optical recording medium such as CD-ROM and DVD, a magneto-optical medium such as a floptical disk, and a hardware device specifically configured to store and execute program instructions, such as ROM, RAM, and flash memory. Examples of the program instructions include not only machine language codes produced by a compiler, but also high-level language codes that can be executed by a computer using an interpreter or the like.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

What is claimed is:

1. An apparatus for extracting a color scheme from a video, the apparatus comprising:
a semi-master shot segmentation part for segmenting an input video into a plurality of semi-master shots through semi-master-shot boundary detection (SBD);
a base palette extraction part for extracting base palettes from the segmented semi-master shots; and
a color scheme merging part for merging the base palettes extracted from the semi-master shots to extract a color scheme;
wherein the base palette extraction part comprises:
a keyframe selection part for reducing the amount of data to be clustered by selecting select keyframes; and
a color clustering part for extracting a base palette from a set of selected keyframes by clustering pixels based on the distance in the color space and selecting the cluster centroids as representative colors;
and wherein the keyframe selection part provides an objective function to ensure that the keyframe captures the entire shot contents well, and the objective function is defined as a weighted sum of saliency, clarity, and representativeness for each frame.

2. The apparatus of claim 1, wherein the semi-master shot segmentation part may provide a semi-master shot by combining contiguous shots taken in the same location with similar colors.

3. The apparatus of claim 1, wherein the semi-master shot segmentation part may segment the input video into a plurality of semi-master shots by performing semi-master-shot boundary detection (SBD) through feature extraction for each frame, similarity measurement between frames, and clustering of similar frames.

4. The apparatus of claim 1, wherein the semi-master shot segmentation part segments the input video into a plurality of semi-master shots by adopting the Imagelab Shot Detector (ILSD) segmentation method, which only considers RGB colors.

5. An apparatus for extracting a color scheme from a video, the apparatus comprising:
a semi-master shot segmentation part for segmenting an input video into a plurality of semi-master shots through semi-master-shot boundary detection (SBD);
a base palette extraction part for extracting base palettes from the segmented semi-master shots; and
a color scheme merging part for merging the base palettes extracted from the semi-master shots to extract a color scheme;
wherein the base palette extraction part comprises:
a keyframe selection part for reducing the amount of data to be clustered by selecting select keyframes; and
a color clustering part for extracting a base palette from a set of selected keyframes by clustering pixels based on the distance in the color space and selecting the cluster centroids as representative colors;
and wherein the color clustering part weights the cluster according to pixel's visual attention using saliency maps from the selected keyframes.

6. The apparatus of claim 1, wherein the color scheme merging part performs additional clustering on the colors of the base palettes to derive a final color scheme.

7. The apparatus of claim 1, wherein the color scheme merging part extracts the color scheme using convex hull enclosing (CHE), and the convex hull enclosing (CHE) converts the plurality of base palettes into convex hull geometry for RGB color space and selects the convex hull boundary vertices as representative colors for the color scheme.

8. The apparatus of claim 1, wherein the color scheme merging part extracts the color scheme using convex hull enclosing (CHE),
wherein the convex hull is split into sub-hulls, and the representative colors of the sub-hulls are selected as the final color scheme.

9. A method for extracting a color scheme from a video by using an apparatus for extracting a color scheme from a video, the method comprising:
a step of segmenting an input video into a plurality of semi-master shots through semi-master-shot boundary detection (SBD);
a step of extracting base palettes from the segmented semi-master shots; and
a step of merging the base palettes extracted from the semi-master shots to extract a color scheme
wherein the step of extracting base palettes from the segmented semi-master shots comprises:
a keyframe selection step in which keyframes are selected to reduce the amount of data to be clustered; and
a color clustering step in which a base palette is extracted from a set of selected keyframes by clustering pixels based on the distance in the color space and selecting the cluster centroids as representative colors;
and wherein, in the keyframe selection step, an objective function is provided to ensure that the keyframe captures the entire shot contents well, and the objective function is defined as a weighted sum of saliency, clarity, and representativeness for each frame.

10. The method of claim 9, wherein, in the step of segmenting an input video into a plurality of semi-master shots, a semi-master shot is provided by combining contiguous shots taken in the same location with similar colors.

11. The method of claim 9, wherein, in the step of segmenting an input video into a plurality of semi-master shots, the input video is segmented into a plurality of semi-master shots by performing semi-master-shot boundary detection (SBD) through feature extraction for each frame, similarity measurement between frames, and clustering of similar frames.

12. The method of claim 9, wherein, in the step of segmenting an input video into a plurality of semi-master shots, the input video is segmented into a plurality of semi-master shots by adopting the Imagelab Shot Detector (ILSD) segmentation method, which only considers RGB colors.

13. The method of claim 9, wherein, in the color clustering step, the cluster is weighted according to pixel's visual attention using saliency maps from the selected keyframes.

14. The method of claim 9, wherein, in the step of merging the base palettes extracted from the semi-master shots to extract a color scheme, additional clustering is performed on the colors of the base palettes to derive a final color scheme.

15. The method of claim 9, wherein, in the step of merging the base palettes extracted from the semi-master shots to extract a color scheme, the color scheme is extracted using convex hull enclosing (CHE), and the convex hull enclosing (CHE) converts the plurality of base palettes into convex hull geometry for RGB color space and selects the convex hull boundary vertices as representative colors for the color scheme.

16. The method of claim 9, wherein, in the step of merging the base palettes extracted from the semi-master shots to extract a color scheme, the convex hull is split into sub-hulls, and the representative colors of the sub-hulls are selected as the final color scheme.

17. The apparatus of claim 5, wherein the semi-master shot segmentation part may provide a semi-master shot by combining contiguous shots taken in the same location with similar colors.

18. The apparatus of claim 5, wherein the semi-master shot segmentation part may segment the input video into a plurality of semi-master shots by performing semi-master-shot boundary detection (SBD) through feature extraction for each frame, similarity measurement between frames, and clustering of similar frames.

19. The apparatus of claim 5, wherein the semi-master shot segmentation part segments the input video into a plurality of semi-master shots by adopting the Imagelab Shot Detector (ILSD) segmentation method, which only considers RGB colors.

20. The apparatus of claim 5, wherein the keyframe selection part provides an objective function to ensure that the keyframe captures the entire shot contents well, and the objective function is defined as a weighted sum of saliency, clarity, and representativeness for each frame.

* * * * *